March 31, 1936.  A. HOCK  2,035,962
BREW KETTLE
Filed Dec. 11, 1933  2 Sheets-Sheet 1

INVENTOR.
Albin Hock
BY James N. Ramsey
ATTORNEY.

March 31, 1936.  A. HOCK  2,035,962
BREW KETTLE
Filed Dec. 11, 1933  2 Sheets-Sheet 2
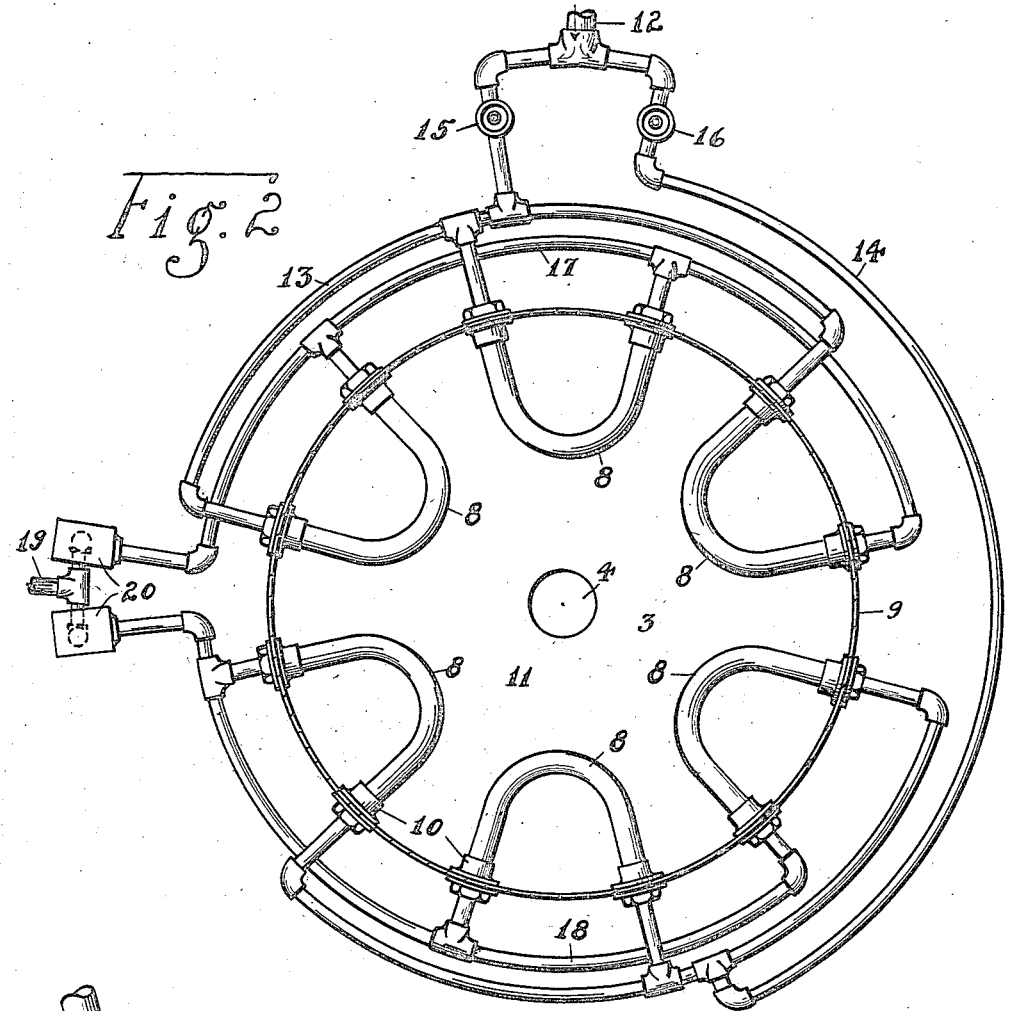
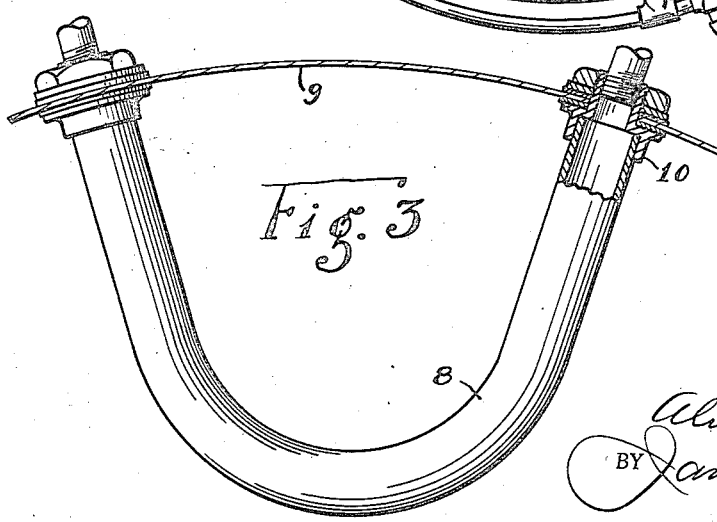
INVENTOR.
Alvin Hock
BY James N. Ramsey
ATTORNEY.

Patented Mar. 31, 1936

2,035,962

UNITED STATES PATENT OFFICE 2,035,962

BREW KETTLE

Alvin Hock, Cincinnati, Ohio,

Application December 11, 1933, Serial No. 701,837

6 Claims. (Cl. 257—198)

My invention relates to improvements in kettles for boiling liquid, and more particularly for brewing beer.

Heretofore brew kettles have been provided with a steam jacket extending over the bottom surface of the kettle with one or more steam inlets on one side and steam outlets in the bottom, whereby the steam enters and passes through the jacket for the purpose of heating the contents of the kettle and discharges through an exhaust pipe near the center of the kettle. This construction of kettle is very expensive, involving great heat loss, as about one-half of the heat is given off through the outer surface of the jacket and is wasted. This construction is liable to explosion and is exceedingly dangerous and very expensive to make and to repair.

Brew kettles have also been provided with coils or scrolls which usually have only one steam inlet and one steam outlet and are very slow in operation due to the steam being condensed in the first couple of rounds or turns of the coil or scroll, leaving the balance of the coil or scroll substantially dead or idle until the entire kettle is boiling, at which stage said rounds or turns first begin to function. When coils or scrolls are used to heat the kettle it is difficult to clean the kettle and the coils.

The primary object of my invention is to overcome these objections and to provide a construction of kettle which is less expensive to make and to operate and one which operates faster, more efficiently and with greater safety than those heretofore used; also one which permits of ready and easy cleaning of the kettle and of the heating U-tubes.

Another object of my invention is to provide a construction and arrangement of parts which will cause the beer to flow upwardly along the sides of the kettle and then inwardly and downwardly, circulating in this manner continuously and thereby effecting the boiling operation more rapidly and efficiently than by the means heretofore used.

Another desirable feature of my invention is that this construction enables the operator to throw the hops out through the outlet hole in the center of the bottom without having coils or scrolls to interfere with his work thereby shortening the time and making his labor much easier. Another advantage of my invention is that by means of the heating U-tubes the beer can be boiled from one side or another and it may be under greater control than otherwise. An important advantage is that with this construction and arrangement 125 pounds of steam pressure or more can be used as against 30 pounds steam pressure used with the steam jacket kettles of the large sizes.

My invention consists in providing a closed kettle or receptacle preferably having a downwardly converging bottom provided with a central outlet therein and having above said bottom a series of U-tubes extending into and out of the kettle and connected to steam inlet and exhaust outlet tubes whereby steam will circulate through said U-tubes which are immersed in the liquid and whereby heat is given off to said liquid from the entire surface of said tubes, so that all of the heat thus transferred is fully utilized.

My invention also consists in the construction, combination, location and arrangement of parts as herein set forth and claimed.

In the drawings:

Fig. 2 is a sectional view on the line 2—2 of Fig. 1;

Fig. 3 is an enlarged view of one of the U-tubes with one of the connections shown in section.

Figure 1:
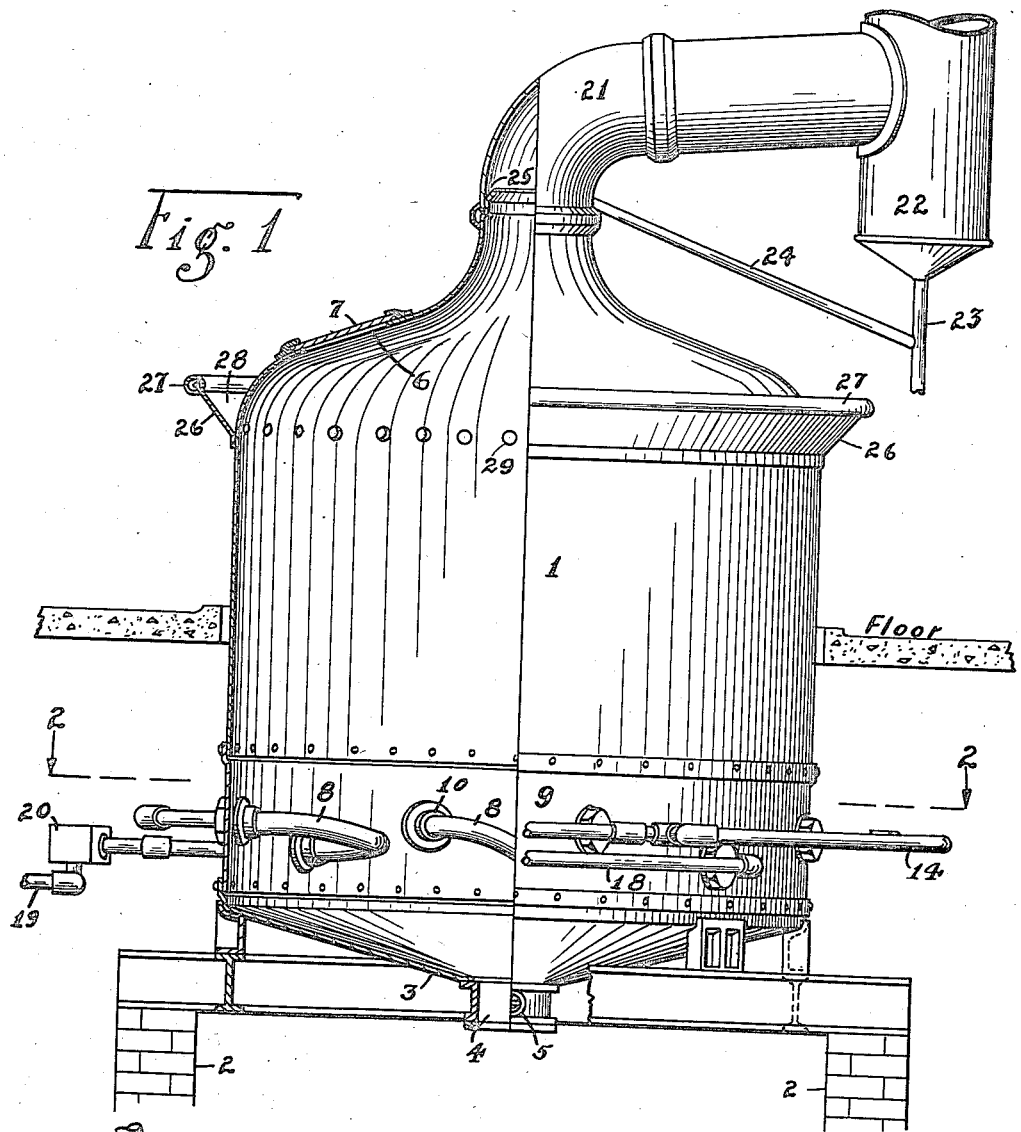
Fig. 1 is a side elevation partly in vertical section.

In the embodiment of my invention as illustrated and which shows a preferred construction, the kettle or receptacle 1 is mounted on a suitable foundation 2 and is preferably provided with a downwardly converging bottom 3 having a central outlet hole 4 closed by a gate 5 which may be opened to discharge the hops and other contents and also for use when cleaning. An opening or manhole 6 is provided near the top for the purpose of introducing material into the kettle and also to permit a person to enter for the purpose of cleaning the interior. Said opening is provided with a suitable cover 7.

As shown in Fig. 1, I provide, near the bottom of the kettle 1, a number of heating U-tubes 8 which are secured to the wall 9 of the kettle by suitable connections 10, said U-tubes being spaced some distance from the bottom of the kettle and being arranged around the wall thereof as shown in Fig. 2, so that a considerable open central space 11 is provided. By referring to Figs. 1 and 2, it will be seen that a workman can readily enter the space 11 between said U-tubes and gain easy access to the bottom for the purpose of cleaning the kettle.

A steam inlet tube 12 communicates with branch steam tubes 13 and 14, each of which is provided with a valve, 15 and 16, respectively. These branch tubes communicate with and admit steam into the U-tubes 8 and the heat of the steam is transferred into the liquid in which said U-tubes are immersed, the exhaust steam passing out and being discharged through outlet tubes 17 and 18, respectively, to exhaust tube 19. Suitable steam traps are provided at 20. A pipe 21 extends upwardly and laterally and enters a vent pipe 22 in which vapors condense and discharge through drain pipe 23. Drain pipe 24 also extends from pipe 21 into drain pipe 23 to carry off any condensation which forms on the inner surface of pipe 21 and collects in trough 25.

An upwardly and outwardly inclined flange 26 having a circular rim 27 is mounted on the upper exterior portion of the kettle to form a trough 28 to collect any over-boiling through the manhole 6 which may take place on the portion of the kettle thereabove, and such collected material is discharged into the kettle through small openings 29.

Figure 4:
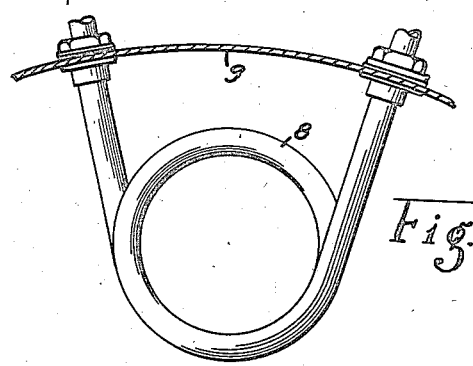
Fig. 4 is a view similar to Fig. 3 showing a modification.

My invention is capable of considerable modification without material departure from its scope or spirit as defined in the claims; as, for instance, the heating tubes may be formed in the shape of a loop as shown in Fig. 4 instead of the U-tube shown in Fig. 3.

My invention is also adapted for use as a cooler by passing a cooling element through the tubes and pipes.

These heating tubes can also be operated in series by connecting them accordingly, having two, three, four, five or six in a unit, or, opposite each other. They can also be set up on the bottom of the kettle if desired, and they can also be turned to vertical position around the shell if desired.

What I claim as new and desire to secure by Letters Patent is:

1. In a mechanism of the class described the combination of a circular kettle or receptacle closed at its top and bottom, and provided with intake and discharge orifices, a first series of U-shaped heating tubes circumferentially spaced around a portion of the interior of the kettle or receptacle near its bottom and substantially parallel therewith, a second series of U-shaped heating tubes circumferentially spaced around the interior of the remaining portion of the kettle and in opposition to the first series, each of said series of tubes having their legs spaced from one another and the legs of the adjacent U-tubes correspondingly spaced from one another thereby providing considerable space around all portions of the U-shaped heater tubes which are immersed by the material introduced into the kettle, means for supplying a heating agent to the first series of tubes, and means for supplying heat to the second series of tubes.

2. In a mechanism of the class described the combination of a circular kettle or receptacle closed at its top and bottom and provided with intake and discharge orifices, a series of U-shaped heating tubes circumferentially spaced around a portion of the interior of the kettle or receptacle near its bottom and substantially parallel therewith, a second series of U-shaped heating tubes circumferentially spaced around the interior of the remaining portion of the kettle and in opposition to the first series, each of said series of tubes having their legs spaced from one another and the legs of the adjacent U-tubes correspondingly spaced from one another thereby providing considerable space around all portions of the U-shaped heater tubes which are immersed by the material introduced into the kettle, means for supplying a heating agent to the tubes comprising a pair of supply pipes one for each series of U-tubes and connected therewith and disposed exteriorly of the kettle, and a common means for supplying the supply pipes.

3. In a mechanism of the class described the combination of a circular kettle or receptacle closed at its top and bottom and provided with intake and discharge orifices, a series of U-shaped heating tubes circumferentially spaced around a portion of the interior of the kettle or receptacle near its bottom and substantially parallel therewith, a second series of U-shaped heating tubes circumferentially spaced around the interior of the remaining portion of the kettle and in opposition to the first series, each of said series of tubes having their legs spaced from one another and the legs of the adjacent U-tubes correspondingly spaced from one another thereby providing considerable space around all portions of the U-shaped heater tubes which are immersed by the material introduced into the kettle, means for supplying a heating agent to the tubes comprising a pair of supply pipes one for each series of U-tubes and connected therewith and disposed exteriorly of the kettle, a common means for supplying the supply pipes, and discharge means exteriorly of the kettle or receptacle for the U-tubes.

4. In means of the class described, a substantially closed brew kettle having means for receiving and discharging the contents thereof, means for heating the contents, a trough around the upper exterior portion of said brew kettle to receive any overboiling, a series of openings in the wall of said brew kettle communicating with the lower part of said trough to drain same into the brew kettle, a vapor discharge vent connected to said brew kettle, a vertical vent pipe connected to said vapor discharge vent, a drain pipe extending from said vapor discharge vent, and an auxiliary drain pipe extending from said vapor discharge vent to said drain pipe, substantially as and for the purposes specified.

5. In a mechanism of the class described the combination of a kettle having a top and bottom respectively provided with a manhole for filling the kettle and for ingress and egress for cleaning purposes and a discharge port for discharging the contents of the kettle, a plurality of U-shaped heating tubes projecting interiorly of the kettle toward the center thereof but stopping short of said center to provide a relatively large area free of tubes at the center of the kettle, the said U-shaped heating tubes being spaced so that substantially corresponding space is provided around each leg of each tube, the said U-shaped tubes being located adjacent to and substantially parallel with the bottom of said kettle whereby said heating tubes are immersed shortly after the introduction of the contents of the kettle so as to substantially immediately commence heating the said contents and continue said heating during the filling of the kettle, and means exteriorly of the kettle connected with each leg of the U-shaped heating tubes for supplying heat thereto.

6. In a mechanism of the class described the combination of a kettle having a top and bottom respectively provided with a manhole for filling the kettle and for ingress and egress for cleaning purposes and a discharge port for discharging the contents of the kettle, a plurality of U-shaped heating tubes projecting interiorly of the kettle toward the center thereof but stopping short of said center to provide a relatively large area free of tubes at the center of the kettle, the said U-shaped heating tubes being spaced so that substantially corresponding space is provided around each leg of each tube, said U-shaped tubes being located adjacent to and substantially parallel with the bottom of said kettle whereby said heating tubes are immersed shortly after the introduction of the contents of the kettle so as to substantially immediately commence heating the said contents and continue said heating during the filling of the kettle, and means exteriorly of the kettle connected with each leg of the U-shaped heating tubes for supplying heat thereto comprising a supply pipe and an exhaust pipe respectively connected with opposite legs of the U-shaped heating tubes and fittings projecting through the wall of the kettle to effect said connection of the supply and exhaust pipes with the U-shaped heating tubes.

ALVIN HOCK.